(12) United States Patent
DiMascio

(10) Patent No.: US 7,476,307 B2
(45) Date of Patent: Jan. 13, 2009

(54) SYSTEMS AND METHODS FOR GENERATING CHLORINE DIOXIDE

(75) Inventor: Felice DiMascio, Rocky Hill, CT (US)

(73) Assignee: Halox Technologies, Inc., Bridgeport, CT (US)

( * ) Notice: Subject to any disclaimer, the term of this patent is extended or adjusted under 35 U.S.C. 154(b) by 904 days.

(21) Appl. No.: 10/773,797

(22) Filed: Feb. 5, 2004

(65) Prior Publication Data

US 2005/0079122 A1 Apr. 14, 2005

Related U.S. Application Data

(63) Continuation-in-part of application No. 10/683,056, filed on Oct. 10, 2003.

(51) Int. Cl.
*C25B 9/00* (2006.01)
*C25B 1/26* (2006.01)

(52) U.S. Cl. ........................ 204/263; 204/237

(58) Field of Classification Search ........................ None
See application file for complete search history.

(56) References Cited

U.S. PATENT DOCUMENTS

| | | | |
|---|---|---|---|
| 3,975,284 A * | 8/1976 | Lambert | 252/187.22 |
| 4,104,190 A | 8/1978 | Hartshorn | |
| 4,632,876 A | 12/1986 | Laird et al. | |
| 4,725,390 A | 2/1988 | Laird et al. | |
| 4,806,215 A * | 2/1989 | Twardowski | 205/510 |
| 4,915,927 A * | 4/1990 | Lipsztajn et al. | 205/344 |
| 5,091,107 A | 2/1992 | Hutchings | |
| 5,106,465 A * | 4/1992 | Kaczur et al. | 205/338 |
| 5,399,288 A | 3/1995 | Marzouk et al. | |
| 5,419,816 A | 5/1995 | Sampson et al. | |
| 5,609,742 A | 3/1997 | Sampson et al. | |
| 5,705,050 A | 1/1998 | Sampson et al. | |
| 5,858,246 A | 1/1999 | Rafter et al. | |
| 6,024,850 A | 2/2000 | Sampson et al. | |
| 6,083,457 A | 7/2000 | Parkinson et al. | |
| 6,197,215 B1 | 3/2001 | Pitochelli | |
| 6,203,688 B1 * | 3/2001 | Lipsztajn et al. | 205/556 |

(Continued)

FOREIGN PATENT DOCUMENTS

GB 2263108 A * 7/1993

OTHER PUBLICATIONS

"Amberlyst™ 31Wet", Technical Data Sheet, obtained at http://www.rohmhaas.com/assets/attachments/business/process_chemicals/amberlyst/amberlyst_31wet/tds/amberlyst_31wet.pdf, accessed Jan. 29, 2008.*

*Primary Examiner*—Harry D Wilkins, III
(74) *Attorney, Agent, or Firm*—Cantor Colburn LLP

(57) ABSTRACT

Processes for generating chlorine dioxide generally include acidifying an alkali metal chlorite solution; and contacting the acidified alkali metal chlorite solution with a solid phase chlorine-containing material to produce chlorine dioxide. An exemplary system for generating chlorine dioxide generally includes a water source in fluid communication with a conduit that is fluidly connected to a vessel, wherein the vessel comprises a housing, an inlet in fluid communication with the housing and the conduit, an outlet, and a solid phase chlorine-containing material disposed within the housing; an acid source downstream from the water source in fluid communication with the conduit; and a chlorite ion source in fluid communication with the conduit downstream from the acid source. Various means are provided for the acid source.

11 Claims, 7 Drawing Sheets

U.S. PATENT DOCUMENTS

| | | |
|---|---|---|
| 6,325,970 B1 | 12/2001 | Parkinson et al. |
| 6,413,416 B1 * | 7/2002 | Buchan ................ 210/97 |
| 6,602,442 B1 | 8/2003 | Pitochelli |
| 6,913,741 B2 * | 7/2005 | DiMascio ................ 423/477 |
| 2002/0053657 A1 | 5/2002 | Parkinson et al. |
| 2003/0039581 A1 | 2/2003 | Parkinson et al. |

* cited by examiner

SYSTEMS AND METHODS FOR GENERATING CHLORINE DIOXIDE

CROSS REFERENCE TO RELATED APPLICATIONS

This application is a continuation-in-part of U.S. patent application Ser. No. 10/683,056, filed on Oct. 10, 2003, incorporated herein by reference in its entirety.

BACKGROUND

The present disclosure relates to systems and methods for generating chlorine dioxide, and more particularly, to systems and methods employing a combination of liquid and solid reactants for generating chlorine dioxide at high conversion efficiencies.

With the decline of gaseous chlorine as a microbiocide and bleaching agent, various alternatives have been explored, including bleach, bleach with bromide, bromo-chlorodimethyl hydantoin, ozone, and chlorine dioxide ($ClO_2$). Of these, chlorine dioxide has generated a great deal of interest for control of microbiological growth in a number of different industries, including the dairy industry, the food and beverage industry, the pulp and paper industries, the fruit and vegetable processing industries, various canning plants, the poultry industry, the beef processing industry and miscellaneous other food processing applications. Chlorine dioxide is also seeing increased use in municipal potable water treatment facilities, potable water pathogen control in office building and healthcare facilities, industrial cooling loops, and in industrial waste treatment facilities, because of its selectivity towards specific environmentally-objectionable waste materials, including phenols, sulfides, cyanides, thiosulfates, and mercaptans. In addition, chlorine dioxide is being used in the oil and gas industry for downhole applications as a well a stimulation enhancement additives.

Unlike chlorine, chlorine dioxide remains a gas when dissolved in aqueous solutions and does not ionize to form weak acids. This property is at least partly responsible for the biocidal effectiveness of chlorine dioxide over a wide pH range, and makes it a logical choice for systems that operate at alkaline pHs or that have poor pH control. Moreover, chlorine dioxide is a highly effective microbiocide at concentrations as low as 0.1 parts per million (ppm) over a wide pH range.

The biocidal activity of chlorine dioxide is believed to be due to its ability to penetrate bacterial cell walls and react with essential amino acids within the cell cytoplasm to disrupt cell metabolism. This mechanism is more efficient than other oxidizers that "burn" on contact and is highly effective against legionella, algae and amoebal cysts, giardia cysts, coliforms, salmonella, shigella, and cryptosporidium.

Unfortunately, chlorine dioxide can become unstable and hazardous under certain temperature and pressure conditions. Although this is only an issue of concern for solutions of relatively high concentration, its shipment, at any concentration, is banned. It is for this reason that chlorine dioxide is always generated on-site, at the point of use, usually from a metal chlorate or metal chlorite as an aqueous solution.

There is a continuing need for improvements in chlorine dioxide generation in terms of costs, design considerations, and ease of use.

BRIEF SUMMARY

Disclosed herein are systems and processes for generating a chlorine dioxide solution. A process for generating a chlorine dioxide solution comprises acidifying an alkali metal chlorite solution to produce a chlorous acid feedstream; dissolving a solid phase chlorine-containing material to produce a dissolved chlorine-containing material feedstream; and mixing the chlorous acid feedstream and the dissolved chlorine-containing material feedstream to produce a chlorine dioxide effluent.

A system for generating chlorine dioxide, comprises a first apparatus for producing a chlorous acid feedstream; a second apparatus for producing a feedstream comprising a dissolved chlorine-containing material, wherein the second apparatus comprises a vessel partially filled with water; an outlet in fluid communication with the water; a cartridge having a lower portion in fluid communication with the water; and a solid phase chlorine-containing material disposed within the cartridge, wherein a portion of the solid phase chlorine-containing material is submerged in the water to produce a dissolved chlorine-containing material feedstream from the vessel outlet; and a reactor comprising an inlet for receiving and mixing the chlorous acid feedstream and the dissolved chlorine-containing material feedstream; and an outlet for discharging a chlorine dioxide effluent.

In another embodiment, the system for producing chlorine dioxide, comprises an electrochemical acidification cell comprising an anode compartment comprising an anode, a cathode compartment comprising a cathode, and a central compartment positioned between the anode and cathode compartments, wherein the central compartment comprises a cation exchange material and an outlet in fluid communication with a conduit; an alkali metal chlorite solution in fluid communication with the central compartment of the acidification cell; a water source in fluid communication with the anode and cathode compartments; and a vessel in fluid communication with the conduit and downstream from the electrochemical acidification cell, wherein the vessel is partially filled with water and comprises an outlet in fluid communication with the water; a cartridge having a lower portion with openings in fluid communication with the water; and a solid phase chlorine-containing material disposed within the cartridge, wherein a portion of the solid phase chlorine-containing material is submerged in the water within the cartridge to produce a dissolved chlorine-containing material feedstream from the vessel outlet.

The above-described embodiments and other features will become better understood from the detailed description that is described in conjunction with the accompanying drawings.

BRIEF DESCRIPTION OF THE DRAWINGS

Referring now to the figures wherein the like elements are numbered alike.

DETAILED DESCRIPTION

Figure 1:
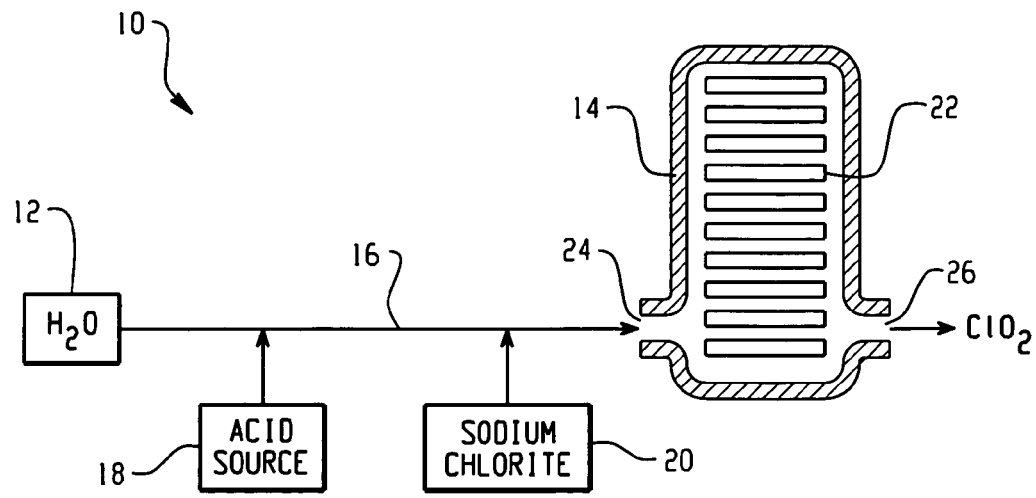
FIG. 1 schematically illustrates a system for generating chlorine dioxide.

Disclosed herein are systems and processes for generating an aqueous solution of chlorine dioxide. The systems and processes generally include acidifying a chlorite ion ($ClO_2^-$) solution with an acid and contacting the acidified chlorite solution with a solid phase chlorine-containing material to produce the chlorine dioxide. In other embodiments, the systems and process contact the acidified chlorite solution with dissolved chlorine-containing material to produce the chlorine dioxide. The resulting systems and processes provide conversion efficiencies greater than about 90% as well as permits latitude in system design.

The chlorite ion solution is preferably an aqueous solution containing a water soluble alkali metal chlorite compound. Suitable alkali metals include sodium, potassium, lithium, and the like, with preference given to sodium salt considering its commercial availability. Suitable commercially available chlorite solutions may contain byproducts from the manufacturing process as well as include stabilizing agents for shipping and storage purposes, the selection of which will depend on the intended application. For example, some commercially available alkali metal chlorite solutions may contain small percentages of chlorates, chlorides, hydrogen peroxide, water, hydroxide ions, and the like. Depending on the application, certain governmental regulatory requirements may dictate the maximum allowable limits for these byproducts or agents since commercially available chlorites solutions are not approved for all applications. For example, drinking water applications generally have maximum allowable limits that are substantially lower than, for example, applications related to the pulp and paper industry.

For industrial use, the alkali metal halite solution is preferably in the form of a 25 percent weight by weight (w/w) % aqueous solution in view of its handling and storage properties, safety, and the like. The primary concern when handling and storing sodium chlorite solutions in excess of 25 (w/w) % is crystallization. Crystallization can occur as a result of lower temperatures with higher concentrations. Crystallization will plug pipelines, valves and other equipment. During operation, the alkali metal chlorite solutions are preferably diluted by the system or diluted prior to introduction into the system. The term "dilute" refers to aqueous alkali metal halite solutions containing less than about 10,000 milligrams alkali metal halite per liter of solution (mg/L), preferably less than about 5,000 mg/L, and more preferably less than about 1,500 mg/L.

The solid phase chlorine-containing materials are preferably selected from the group consisting of chloroisocyanurates such as trichloroisocyanurates (i.e., trichloro-s-triazinetrione or trichloro isocyanuric acid), dichloroisocynaurate, e.g., sodium dichloroisocyanuric acid, sodium dichloroisocyanurate, or dichloroisocyanuric acid, ion either anhydrous and/or dihydrate forms, and the like; hypochlorite such as calcium hypochlorite, lithium hypochlorite, sodium hypochlorite, among others; and other like solid phase chlorine-containing materials that are stable as used in the system. Advantageously, compared to liquids, chlorine-containing materials in the solid phase are relatively safe, are less corrosive, and provide better handling capabilities. The solid phase chlorine-containing materials can be of any size, shape, and geometry as may be desired for a given application including, but not limited to, tablets, pellets, rods, or granules having spherical, cylindrical, or other various polygonal shapes. In addition, regulatory requirements should be taken into consideration when selecting suitable commercial sources since different applications will be governed by different requirements. As a general rule, the physical and chemical characteristics of the solid phase chlorine-containing materials are selected so that the reaction rate is greater than the erosion rate. Preferably, the solid phase chlorine-containing materials are selected to have a solubility limit of about 0.1 to about 500 grams per liter (g/l), with about 1 to about 350 g/l more preferred, and with about 10 to about 260 g/l even more preferred.

Referring now to FIG. 1, there is shown a system for generating chlorine dioxide. The system 10 generally includes a water source 12 in fluid communication with a vessel 14 by means of a conduit 16. Downstream from the water source 12 and in fluid communication with the conduit 16 is an acid source 18 for introducing an acid into the feedstream. Downstream from the acid source is a chlorite ion source 20 for introducing a source of chlorite ions into the acidified feedstream flowing through the conduit 16. The vessel 14 contains the solid phase chlorine-containing material 22 and has an inlet 24 in fluid communication with the conduit 16 and an outlet 26. In this manner, an acidified feedstream of the chlorite ions enters the vessel 14 and contacts the solid phase chlorine-containing material 22 to produce a chlorine dioxide effluent form the vessel 14.

Optionally, vessel 14 is removable from the system 10 (an other systems to be described herein) to provide ease in placing the solid phase material into the vessel. The solid phase material, depending on the shape and geometry, can be uniformly arranged, such as the stackedly arranged tablets shown in FIG. 1 or may be non-uniformly arranged such as would be readily evident from the use of granular solid phase materials. The arrangement of the solid phase material is not intended to be limited to any particular form and will generally depend on the design and shape of the vessel, the shape and geometry of the solid phase material, as well as the intended application.

The vessel 14 may further include a dump valve to maintain a precise water level in the vessel during operation and period of non-use, i.e., system shutdown. For example, the dump valve can be configured to open when the system is turned off so as to remove water from the vessel. In this manner, continued dissolution of the solid phase material during off state conditions can be employed, thereby preventing erosion as well as further reaction. Although a single vessel is shown, the system may include numerous vessels connected in parallel or the like. Alternatively, the vessel can include numerous chambers in fluid communication with the conduit 16. The chambers themselves may be interconnected, if desired. Moreover, it will be recognized by those in the art that the system can be designed as a flow proportion system, a residual system, or a compound closed loop system with only minor modifications.

The acid source 18 is preferably an aqueous solution containing a protic acid that is selected on its ability to protonate the chlorite ion source and/or form chlorous acid after contact with the chlorite ion source. Suitable protic acids include, but are not intended to be limited to, hydrochloric acid (HCl), hydrobromic acid (HBr), hydriodic acid (HI), nitric acid ($HNO_3$), sulfuric acid ($H_2SO_4$), perchloric acid ($HClO_4$), and the like. Other suitable acid sources will be apparent to those skilled in the art in view of this disclosure. The amount of acid employed is stoichiometric based on the amount of chlorite solution introduced into the feedstream. Preferably, the stoichiometric ratio of acid to chlorite ions is about 1:4 to about 4:1, with about 1:2 to about 2:1 more preferred, and with about 4:5 to about 5:4 even more preferred. Additional amounts of acid may be employed depending the constituency of the inert ingredients in the solid phase material, in the chlorite ion source or in the feed water. The use of the additional acid would advantageously neutralize alkaline contaminants present. For example, commercially available calcium hypochlorite tablets are typically shipped as $3Ca(OCl)_2 2Ca(OH)_2 3H_2O$, where commercially available calcium hydroxide is typically shipped as $Ca(OH)_2$. It should be noted that calcium hydroxide is preferably first neutralized with acid in order to lower the pH of the reaction medium to an optimum value.

Pumps, eductors, injectors, water-driven pumps, or the like (not shown) are preferably employed with the acid source 18 and the chlorite ion source 20 for accurately metering the preferred amounts of acid and chlorite ions into the conduit 16. The acidified chlorite ion feedstream then enters the vessel 14 via inlet 24, wherein the acidified chlorite ion feedstream contacts the solid phase chlorine 22 to generate an effluent containing chlorine dioxide. The system 10 is preferably designed to convert the chlorite ion source to chlorine dioxide at greater than about 90% efficiency, with a conversion efficiency greater than 95% more preferred, and with a conversion efficiency greater than 97% even more preferred.

It has been found that the conversion efficiency is directly related to the pH of the feedstream as it enters vessel 14. At relatively high pH values, i.e., a pH greater than 7.0, the conversion efficiency is low due to the dissolved chlorine dioxide in solution hydrolyzing to form chlorate and chlorite ions. Also, at relatively low pH values, i.e., a pH less than 2.0, the conversion is also low due to the dissolved chlorine dioxide in solution decomposing to chloric acid and hydrochloric acid. Preferably the pH of the acidified chlorite ion feedstream as it enters the vessel 14 is less than about 7, with less than about 5 more preferred, and with less than about 3 even more preferred. In a preferred embodiment, the pH is from about 2 to about 3.

The contact time of the acidified chlorite solutions with the solid phase chlorine-containing materials for system 10, as well as for the various systems that will be described herein, is preferably about 0.1 to about 10 minutes (min), with a contact time of about 0.5 to about 5 min more preferred, and a contact time of about 0.75 to about 1.25 min even more preferred. Preferably, the solid phase chlorine-containing materials are selected to provide a constant level of dissolution in order to maintain a relatively constant concentration and production of chlorine dioxide. Materials that have become softened from moisture absorption erode at different rates compared to materials exhibiting minimal absorption. Thus, care is preferably taken in choosing the composition of the solid phase chlorine-containing material with particular care in the selection and amount of inert materials contained therein. The solid phase materials preferably have similar and consistent dissolution behavior in and between the various amounts of solid phase materials used.

The solid fraction of the solid phase material in the vessel, e.g., the total volume of the solid phase material divided by the total vessel volume, is preferably about 40 to about 90 percent volume by volume (v/v) %, with about 50 to about 80 (v/v) % more preferred, and with about 55 to about 75 (v/v) % even more preferred. The pressure drop through the vessel containing the solid phase material is preferably about 1 to about 40 pounds per square inch (psi), with about 1 to about 20 psi more preferred, and with about 1 to about 10 psi even more preferred. The temperature of the feedstream is preferably controlled during operation since temperature directly affects reactivity. Preferably, the temperature is at about 5 to about 60 degree Celsius (° C.), with about 10 to about 30° C. more preferred, and with a temperature of about 15 to about 25° C. even more preferred. Chiller and/or heaters may optionally be employed with the various systems to maintain the feedstream temperature at the preferred temperatures.

Figure 2:
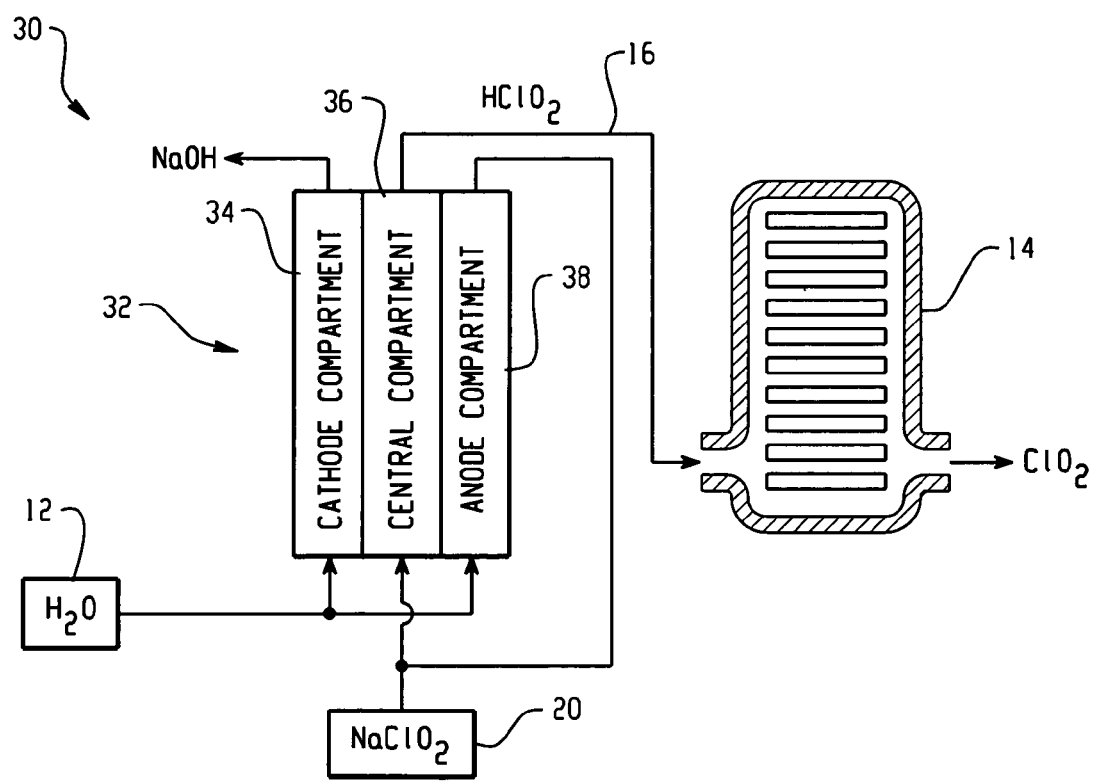
FIG. 2 schematically illustrates a system for generating chlorine dioxide in accordance with a second embodiment.

Referring now to system 30 as shown in FIG. 2, an electrochemical acidification cell 32 configured with three compartments is illustrated and employed in combination with the vessel 14 containing the solid phase chlorine-containing material 22. Although reference is made to three compartments, the acidification cell is exemplary and can be of any configuration as is desired. The acidification cell 32 preferably provides protons to the chlorite ion source. The three-compartment acidification cell 32 as shown generally comprises a cathode compartment 34, a central compartment 36, and an anode compartment 38. The central compartment 36 is interposed between the anode and cathode compartments 34, 38, respectively.

Figure 3A:
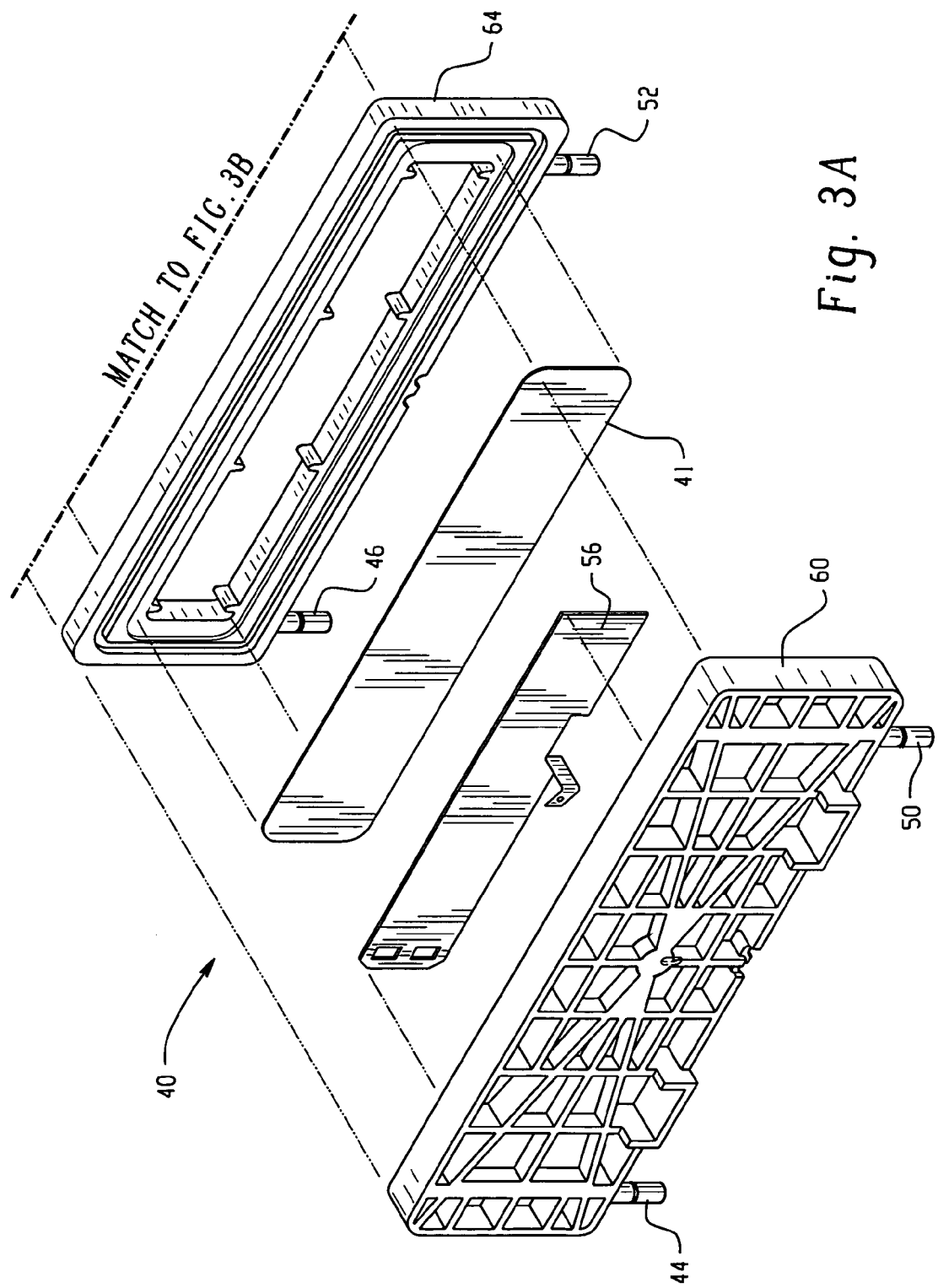
FIGS. 3A, B illustrate an isometric view of an electrochemical acidification cell.
Figure 3B:
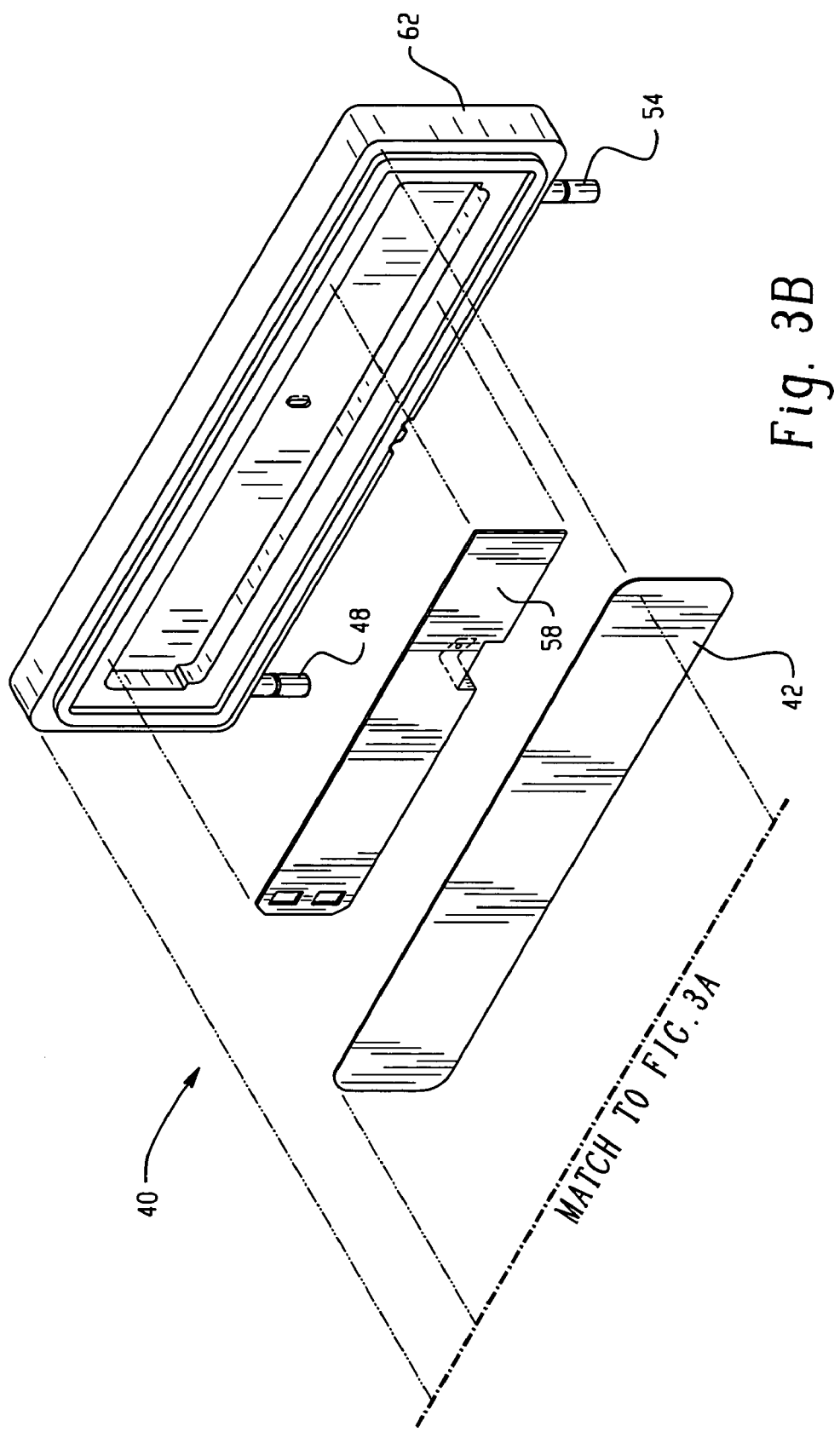

Referring now to FIGS. 3A and 3B, there is shown an exploded isometric view of an exemplary electrochemical acidification cell 40 employing the three-compartment cell configuration 32 as described in relation to FIG. 2. The cell 40 is formed from stock materials that are preferably chemically inert and non-conductive. Components forming the cell 40 may be molded for high volume production or alternatively, may be machined as described in further detail below.

The exemplary cell 40 is fabricated from two pieces of flat stock 60 and 62, about 10.2 centimeter (cm) across by about 35.6 cm long by about 2.5 cm thick. The pieces 60, 62 are machined such that depressions 0.6 cm deep by 5.1 cm across by 31.5 cm long are cut in the center of each piece. The pieces 60, 62 are then drilled and tapped to accept the anode 58 and cathode 56. Each piece further includes inlets 44, 48 and outlets 50, 54, through which fluid would flow. The anode 58 and cathode 56 are approximately 5.1 cm across by 22.9 cm long and are inserted into the stock pieces 60 and 62. Membranes 41, 42 are disposed over each depression formed in stock pieces 60, 62. Preferably, membrane 41 is a cation exchange membrane. Approximately 150 milliliters (mL) of particulate material (not shown) may optionally be packed into each depression to form the anode compartment 36 and the cathode compartment 34 (as shown in FIG. 2). As constructed, the particulate material, if present in the cathode and/or anode compartments, is configured to be in direct contact with the anode 58 or cathode 56.

Interposed between membranes 41, 42 is a piece of flat stock 64, about 10.2 cm across by about 35.6 cm long by 2.5 cm thick. The stock piece 64 is machined such that a hole about 5.1 cm across by 30.5 cm long is cut through the piece to form the central compartment 36 (as shown in FIG. 2). The piece 64 is then drilled and tapped to accept two fittings that form inlet 46 and outlet 52 through which fluid would flow. The central compartment 36 is filled with about 150 mL of particulate material that includes the cation exchange material. The components of the electrolytic reactor cell 40 are assembled and bolted together, or otherwise secured. In this configuration, the aqueous alkali metal chlorite solution or sodium chloride solution is preferably passed through the central compartment 36 and is not in direct contact with the anode 58 or cathode 56. In a preferred embodiment, the cell 40 is formed from an acrylonitrile-butadiene-styrene (ABS)

terpolymer. Other suitable materials include polyvinylchloride (PVC), chlorinated PVC, polyvinylidene difluoride (PVDF), polytetrafluoroethylene (PTFE), fluorinated ethylene propylene copolymer (FEP), perfluoropropylalkoxy copolymer (PFA), perfluoromethylalkoxy copolymer (MFA), polychlorotrifluoroethylene copolymer (ECTFE), and ethylene tetrafluoroethylene (ETFE).

Other embodiments include, but are not limited to, separation of the anode and cathode compartments to control intermixing of gases and solutions and provision of any number of packed-bed compartments separated by membranes placed between the anode and cathode to affect other oxidation, reduction or displacement reactions.

As used herein, the term "particulate material" refers to a cation exchange material. Any cation exchange material can be used provided portions of its active sites are occupied with hydrogen, i.e., cation exchange material in the hydrogen form. In a preferred embodiment, the particulate material in compartment 36 includes the cation exchange material or a mixture of the cation exchange material and a catalyst material. The particulate material may also include an additive or additives to achieve certain results. For example, electrically conductive particles, such as carbon and the like, can be used to affect the transfer of DC current across electrodes. However, some additives, such as carbon, are prone to disintegration in acidic environments, thus requiring careful selection.

As used herein, the term "membrane" generally refers to a sheet for separating adjacent compartments, e.g., compartments 34 and 36. In this regard, the term "membrane" can be used interchangeably with screen, diaphragm, partition, barrier, a sheet, a foam, a sponge-like structure, a canvas, and the like. The membranes 41, 42 can be chosen to be permselective, e.g., a cation exchange membrane, or can be chosen to be non-permselective, e.g., a porous membrane. As used herein, the term "permselective" refers to a selective permeation of commonly charged ionic species through the membrane with respect to other diffusing or migrating ionic species having a different charge in a mixture. In contrast, the term "non-permselective" generally refers to a porous structure that does not discriminate among differently charged ionic species as the species pass through the porous structure, i.e., the membrane is non-selective with respect to ionic species. For example, in a permselective membrane such as a cation exchange membrane, cations can freely pass through the membrane whereas the passage of anions is prevented. In contrast, in a non-permselective membrane such as a porous membrane, the passage of anions and cations through the porous membrane are controlled by diffusion.

More preferably, the particulate material comprises a catalyst material. The term "catalyst material" refers to a support and an active metal catalyst. Preferably, the active metal catalyst is finely and discretely deposited onto the support. In a preferred embodiment, the active metal catalyst is a noble metal. While not wanting to be bound by theory, it is believed that the catalytic activity of the active metal is associated with crystal imperfections and the finely divided deposits help to increase the surface area as well as increase the number of active catalytic sites. Suitable active metal and active metal oxide catalysts include, but are not limited to, metals of Groups of 4a, 4b, 5b, 6b, 7, and 8 of the Periodic Table of Elements, and composites or mixtures or alloys of at least one of the foregoing metal catalysts. Preferably, the active metal catalyst is an oxide of a metal selected from the group consisting of transition metals of Group 8 of the Periodic Table of Elements. More preferably, the active metal catalyst is a platinum oxide.

In another embodiment, the active metal catalyst and active metal oxides are transition metals of Group 8 of the Periodic Table of Elements, mixtures or alloys of at least one of the foregoing transition metals and a less active metal or metal oxide including metals from Groups of 4a, 4b, Elements, or mixtures, or alloys of at least one of the foregoing metals. Preferably, the molar ratio of the active metal catalyst to the less active metal catalyst is of about 0.3:1 to about 100:1. More preferably, the molar ratio of the active metal catalyst to the less active metal catalyst is about 10:1.

Suitable supports for the catalyst material include metals, zeolites, anthracite, glauconite, faujasite, mordenite, clinoptilolite, aluminas, silicas, clays, ceramics, carbon and the like. Of these supports, ceramics are most preferred. In a preferred embodiment, the catalyst materials are made from those ceramics described in U.S. Pat. Nos. 4,725,390 and 4,632,876, herein incorporated by reference in their entireties. Preferred ceramics are those made essentially from nonmetallic minerals (such as mineral clays) by firing at an elevated temperature. More preferred are ceramic materials commercially available under the trade name MACROLITE® by the Kinetico Company. The MACROLITE® ceramic materials are spherically shaped and characterized by having a rough texture, high surface area, and level of moisture absorption of less than about 0.5%. The low level of moisture absorption allows for the metal oxide precursor solution to penetrate a minimal depth into the surface of the ceramic, thereby depositing metal onto the external surface of the support, an optimum location for subsequent contact with an aqueous solution. The surface area of the MACROLITE® ceramic materials is believed to be on the order of about 103 $m^2$ per gram.

The anode 58 and the cathode 56 may be made of any suitable material based primarily on the intended use of the electrolytic reactor, costs and chemical stability. For example, the anode 58 may be made of a conductive material, such as ruthenium, iridium, titanium, platinum, vanadium, tungsten, tantalum, oxides of at least one of the foregoing, combinations including at least one of the foregoing, and the like. Preferably, the anode 58 comprises a metal oxide catalyst material disposed on a suitable support. For electrolytically exposing chlorine based solutions such as the aqueous sodium chloride solution previously described, it is preferred that a ruthenium oxide based anode be employed. Suitable ruthenium oxide based electrodes are commercially available from the Eltech Systems Corporation, Ohio. The supports are typically in the form of a sheet, screen, or the like and are formed from a rigid material such as titanium, niobium, and the like. The cathode 56 may be made from stainless steel, steel or may be made from the same material as the anode 58.

The permselective membranes, e.g., 41, 42, preferably contain acidic groups so that ions with a positive charge can be attracted and selectively passed through the membrane in preference to anions. Preferably, the permselective membranes contain strongly acidic groups, such as R-S03 and are resistant to oxidation and temperature effects. In a preferred embodiment, the permselective membranes are fluoropolymers that are substantially chemically inert to chiorous acid and the materials or environment used to produce the chlorine dioxide. Examples of suitable permselective membranes include perfluorosulfonate cation exchange membranes commercially available under the trade name NAFION from E.I. duPont de Nemours, Wilmington, DE.

Examples of suitable cation exchange resins or materials include, but are not intended to be limited to, polystyrene divinylbenzene cross-linked cation exchangers (e.g., strong acid types, weak acid types, iminodiacetic acid types, chelating selective cation exchangers and the like); strong acid perfluorosulfonated cation exchangers; naturally occurring cation exchangers, such as manganese greensand; high surface area macro-reticular or microporous type ion exchange resins having sufficient ion conductivity, and the like. For example, strong acid type exchange materials suitable for use are commercially available from Mitsubishi Chemical under the Diaion trade name. Optionally, the cation exchange material may be further modified, wherein a portion of the ionic sites are converted to semiconductor junctions, such as described in U.S. Pat. Nos. 6,024,850, 5,419,816, 5,705,050 and 5,609,742, herein incorporated by reference in their entireties. However, the use of modified cation exchange material is less preferred because of the inherent costs associated in producing the modification. In a preferred embodiment, the cation exchange materials have a cross-linking density greater than about 8%, with greater than about 25% more preferred and with greater than about 50% even more preferred. Increasing the cross-linking density of the cation exchange materials has been found to increase the resistance of the cation exchange materials to effects of the electrolytic environment such as oxidation and degradation. As a result, operating lifetimes for the electrolytic reactor can advantageously be extended.

The packing density and conductivity of the particulate material disposed within a compartment can be adjusted depending on the operating parameters and desired performance for the electrolytic reactors. For example, the particulate material may be shrunk, if applicable, before use in the electrolytic reactor, such as by dehydration or electrolyte adsorption. Dehydration may be by any method in which moisture is removed from the ion exchange material, for example, using a drying oven. It has been found that dehydration prior to packing can increase the packing density by as much as 40%. Electrolyte adsorption involves soaking the material in a salt solution, such as sodium chloride. The packing density of the material so treated can be increased by as much as 20%. The increase in packing density advantageously increases the volume in which the DC current travels, thus reducing the electrical resistance in the electrolytic reactor.

The particulate material of the electrolytic reactor is not intended to be limited to any particular shape. Suitable shapes include rods, extrudates, tablets, pills, irregular shaped particles, spheres, spheroids, capsules, discs, pellets or the like. In a preferred embodiment, the particulate material is spherical. More preferably, the particulate material includes a reticulated and textured surface having an increased surface area. The sizes of the particulate material employed are dependent on the acceptable pressure drop across the respective bed, i.e., compartment. The smaller the particulate material, the greater the pressure drops.

In the preferred application for generating chlorine dioxide, the system 30 is configured with the three-compartment electrolytic cell 32 as previously described, wherein the central compartment preferably comprises a cation exchange membrane 41,42 separating the anode compartment 38 from the central compartment 34. Catalyst material or a mixture of catalyst material and cation exchange material is preferably disposed in the central compartment 36.

When using the electrochemical acidification cell for acidifying the chlorite ion source, the applied current can be calculated by one of ordinary skill in the art by using Faradays law to correspond to the desired stoichiometric ratio. Preferably, the current efficiency is about 30 to about 90%, with about 40 to about 80% more preferred, and with about 50 to about 70% even more preferred. When using the acidification cell to covert sodium salt to the hydrogen form, the sodium salt concentration and the applied current can be manipulated to establish the desired stoichiometric ratio.

Figure 4:
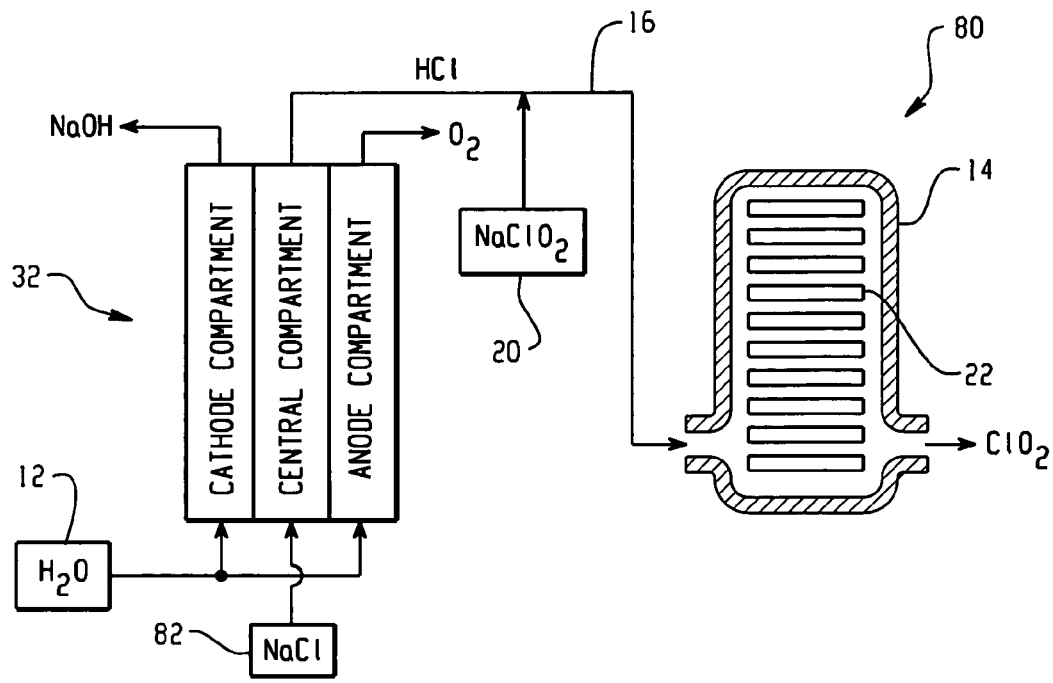
FIG. 4 schematically illustrates a system for generating chlorine dioxide in accordance with a third embodiment.

FIG. 4 schematically illustrates system 80, which employs the use of sodium chloride 82 in the acidification cell 32 to generate an effluent containing HCl to provide an acidified feedstream. The chlorite ion source is fed into conduit 16 downstream from the acidification cell to produce an acidified chlorite ion feedstream, which is then fed to vessel 14 where the feedstream then contacts the solid phase chlorine-containing material 22 to produce chlorine dioxide.

Although reference is made to sodium chloride, other alkali and alkaline earth metal inorganic salts can be employed that generate either a strong or weak acid. As used herein, the term strong as used in the context of acids refers to complete dissociation in water, i.e., no acid molecules are present, only hydrogen ions and anions. The term weak as used in the context of acids refers to partial dissociation in water, i.e., acid molecules exist with hydrogen ions and anions. Preferably, salts of acids, including aqueous solutions of mixtures of salts are employed. Suitable salts include, but are not intended to be limited to, alkali and alkaline earth metal salts of chlorides, bromides, iodides, nitrates, sulfates, perchlorates, phosphates, nitrites, sulfites, and the like.

Figure 5:
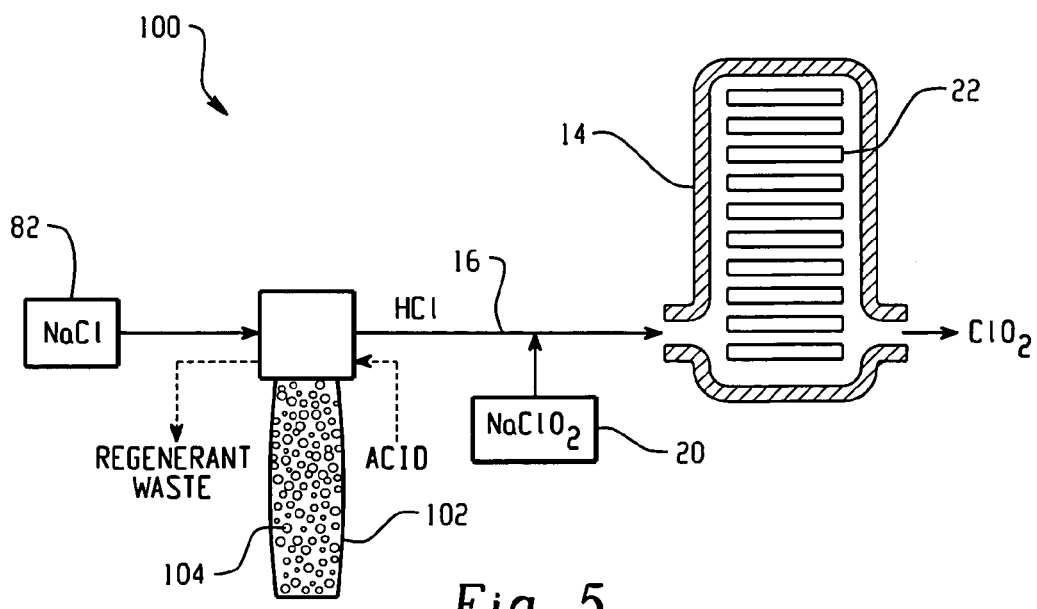
FIG. 5 schematically illustrates a system for generating chlorine dioxide in accordance with a fourth embodiment.

FIG. 5 schematically illustrates system 100, which utilizes a cation exchange cartridge 102 in combination with the vessel 14 containing the solid phase chlorine-containing material 22. The cation exchange cartridge 102 contains cation exchange resin 104 in the hydrogen form of the type previously described in relation to the electrochemical acidification cell 32. A sodium chloride solution 82 is fed into the regenerable cation exchange column 102, wherein sodium ions are exchanged with protons to produce an acidified effluent of HCl into conduit 16. Downstream, a chlorite ion source 20 is fed into conduit 16 to produce an acidified chlorite ion solution, which is then fed into vessel 14. The acidified chlorite solution contacts the solid phase chlorine-containing material contained therein to produce a chlorine dioxide effluent.

When the cation exchange material 104 reaches its exhaustion point or is near exhaustion, it may be replaced or readily regenerated in place by a strong or weak acid so as to exchange the alkali or alkaline earth metal previously adsorbed onto the active sites of the cation exchange material 104 for hydrogen ions. Regeneration of the cation exchange column can be in either a co-current flow direction or a counter-current flow direction relative to the normal operating flow direction through the cation exchange column, or alternatively, may be pulsed. Preferably, a backwashing step precedes regeneration so as to remove any particulate matter that may have been in solution during operation of system 100. Following regeneration, the cation exchange material 104 is preferably rinsed substantially free of excess regenerant prior to operating the column in the manner previously described.

Figure 6:
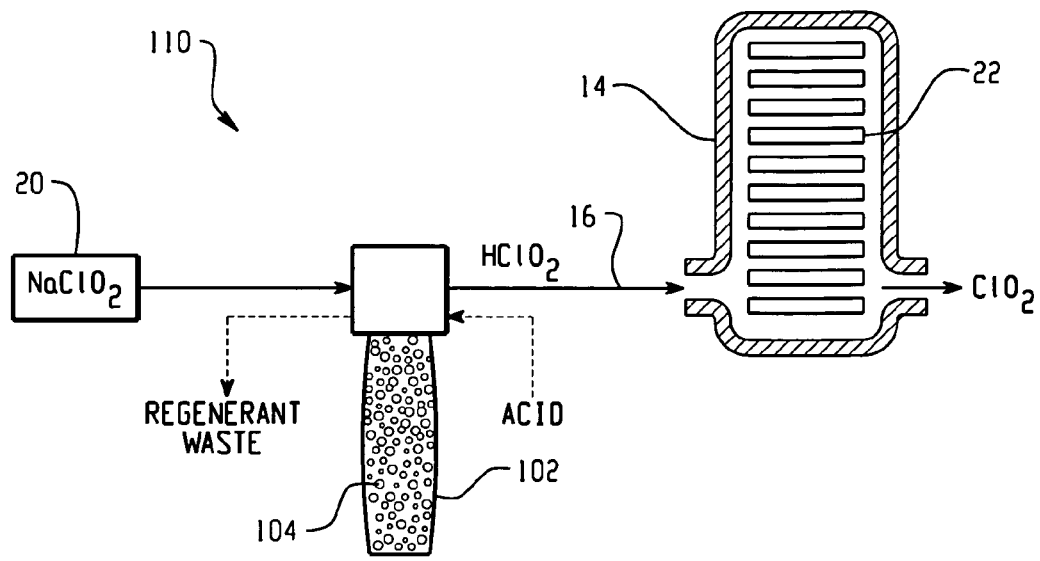
FIG. 6 schematically illustrates a system for generating chlorine dioxide in accordance with a fifth embodiment.

FIG. 6 illustrates an alternative embodiment of system 100. In this system, generally designated 110, an alkali metal chlorite solution 20 is fed into the regenerable cation exchange cartridge 102 to produce chlorous acid, which is then fed directly to vessel 14. The chlorous acid contacts the solid phase chlorine-containing material 22 to produce a chlorine dioxide effluent.

Figure 8:
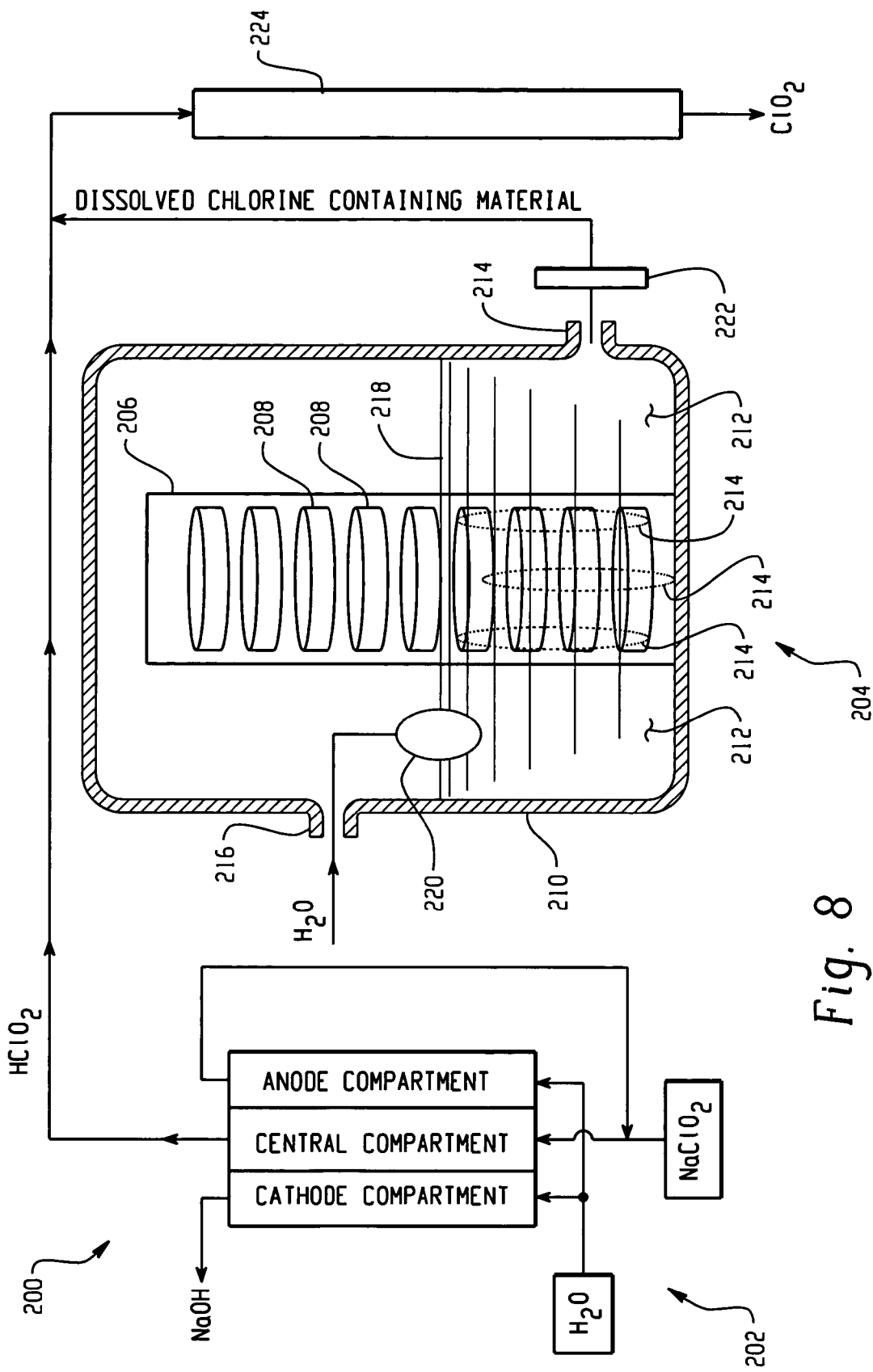
FIG. 8 schematically illustrates a system for generating chlorine dioxide in accordance with a sixth embodiment.

FIG. 8 schematically illustrates system 200, generally includes an apparatus 202 for generating a chlorous acid feedstream and an apparatus 204 for providing an aqueous halogen or halogen containing feedstream. The feedstreams are combined downstream to produce chlorine dioxide.

Advantageously, system 200 can be employed to convert a chlorite ion source to chlorine dioxide at greater than about 90% efficiency.

Apparatus 202 can be any one of the previously described apparatuses for generating an acidified chlorite feedstream. In a preferred embodiment, the apparatus is the electrochemical acidification cell as shown and discussed in relation to FIG. 2. An chlorous acid feedstream is produced by acidification cell.

Apparatus 204 generates a feedstream containing dissolved chlorine-containing material. The apparatus 204 includes at least one cartridge 206 filled with the solid phase chlorine-containing material 208 and disposed within a container 210 that is partially filled with water 212. A lower portion of the cartridge includes fluid passageways 214 (as shown by dotted line) for permitting water to enter the lower portion of the cartridge 206. The vessel 210 further includes an outlet 214 in fluid communication with the water 212. The system 200 further includes a water inlet 216 disposed above the water line 218 and a float valve 220 or other means for monitoring the level of the water. The float valve 220 is in operative communication with the inlet 216 to maintain the water at a predetermined level. An optional pump 222 is employed for regulating the flow rate of the dissolved solid phase chlorine-containing material from the vessel. During operation, dry solid phase chlorine-containing material is gravity fed to the submerged portion as the wetted solid phase chlorine-containing materials dissolve. Exhaustion of the solid phase material 208 can be easily monitored and a replacement cartridge can be installed or replacement tablets can be inserted into the cartridge to provide a continuously saturated solution.

The concentration and flow rate of the dissolved chlorine-containing material that is able to deliver free available chlorine are based on its solubility limit or saturation concentration, contact time in the surrounding solution, and contact area per volume of solution. In this particular apparatus, the amount of water in vessel 210 is based on the pump draw rate and solubility limit of the chlorine-containing material. The contact time, e.g., liquid volume in vessel 210 divided by the pump draw flow rate, is preferably between about 20 to about 800,000 min, with about 200 to about 80,000 min more preferred, and with about 2,000 to about 8,000 min even more preferred. The pH of the dissolved chlorine-containing material is greater than 0 to about 14, with about 2.0 to about 13.7 more preferred, and with about 2.5 to about 13.5 even more preferred.

The contact area per volume of solution, e.g., surface area of the chlorine-containing material divided by the volume of the surrounding solution, will vary greatly depending on the shape and density of the material. For example, a volume of granular material will have a specific surface area much greater than that of a 2.54 cm diameter tablet or a 7.62 cm diameter puck. The contact area per unit volume of solution is preferably about 0.0002 to about 3.14 cm$^{-1}$, with about 0.002 to about 0.628 cm$^{-1}$ more preferred, and with about 0.02 to about 0.31 cm$^{-1}$ even more preferred.

Apparatus 204 produces a chlorine-containing material feedstream that is combined with the chlorous acid feedstream to produce chlorine dioxide. The chlorine-containing material feedstream and the chlorous acid feedstream may be fed to an optional reaction column 224 to insure thorough mixing of the two feedstreams. The reaction column may include an ion exchange material or the like to remove any undesirable impurities. The reaction time, e.g., reaction column volume divided by the volumetric flow rate, is preferably between about 0.1 and about 100 min, with between about 0.5 to about 50 min more preferred, and with between about 0.75 and about 12.5 min most preferred. The pH of the resulting chlorine dioxide stream is preferably about 1 to about 7, with about 1 to about 5 more preferred, and with about 2 to 3 even more preferred.

The type of reaction clearly depends on the system and material employed as the solid phase chlorine-containing material. Generally, the chlorite ion source is protonated by various means described above to produce a chlorous acid containing feedstream, which then contacts the solid phase chlorine-containing material 22. The concentration of chlorous acid produced in the systems, is preferably less than about 6.0 grams per liter (g/L), with less than about 3.0 g/L more preferred and less than about 0.65 g/L even more preferred. Also preferred is a chlorous acid concentration greater than about 0.06 g/L, with greater than about 0.30 g/L more preferred and greater than about 0.5 g/L even more preferred. At concentrations greater than about 4.0 g/L, there is a risk of chlorine dioxide exceeding its solubility limit and creating a vapour phase that is dangerous. Gas phase chlorine dioxide concentration in excess of 10 vol. % at 40° C. can decompose explosively into chlorine, oxygen, and heat, liberating approximately 104.6 kJ per mole.

In the case of solid phase calcium hypochlorite, while not wanting to be bound by theory, it is believed that the following reaction takes place upon acidification such as with HCl (e.g., systems 10, 80, 100) as shown by equation (I).

$$4NaClO_2 + CaCl_2O_2 + 4HCl \rightarrow 4ClO_2 + 2H_2O + 4NaCl\ 2CaCl_2 \quad (I)$$

Alternatively, chlorine dioxide can be generated by protonating and/or exchanging the alkali metal halite solution (e.g., systems 30, 110) as shown to produce chlorous acid, which then contacts the solid phase calcium hypochlorite, as shown in equation (II).

$$4HClO_2 + CaCl_2O_2 \rightarrow 4ClO_2 + 2H_2O + CaCl_2 \quad (II)$$

In the case of dichloroisocyanurate solid phase materials, it is believed the following reaction takes place upon acidification such as with HCl as shown by equation (III).

$$4NaClO_2 + C_3Cl_2N_3NaO_3 + 2\ HCl \rightarrow 4ClO_2 + 4\ NaCl + C_3N_3O_3NaH_2 \quad (III)$$

Alternatively, chlorine dioxide can be generated by protonating and/or exchanging the alkali metal halite solution as shown to produce chlorous acid, which then contacts the solid phase dichloroisocyanurate, as shown in equation (IV).

$$4\ HClO_2 + C_3Cl_2N_3NaO_3 \rightarrow 4ClO_2 + 2HCl + C_3N_3O_3NaH_2 \quad (IV)$$

In the case of trichloroisocyanurate solid phase materials, it is believed the following reaction takes place upon acidification such as with HCl as shown by equation (V).

$$6NaClO_2 + C_3N_3O_3Cl_3 + 3HCl \rightarrow 6\ ClO_2 + 6NaCl + C_3N_3O_3H_3 \quad (V)$$

Alternatively, chlorine dioxide can be generated by protonating and/or exchanging the alkali metal halite solution as shown to produce chlorous acid, which then contacts the solid phase trichloroisocyanurate, as shown in equation (VI).

$$6HClO_2 + C_3N_3O_3Cl_3 \rightarrow 6ClO_2 + 3HCl + C_3N_3O_3H_3 \quad (VI)$$

The disclosure is further illustrated by the following non-limiting Examples.

EXAMPLE 1

In this example, a three compartment electrochemical acidification cell as shown and described in relation to FIGS.

2-4 was employed to electrochemically acidify a sodium chlorite feedstream, which was then fed through a cell containing 1,1,1-trichloro-s-triazinetrione in the solid phase. Each compartment of the electrochemical acidification cell included a width and length of 5.1 and 25.4 cm, respectively. The thickness of the central compartment was 1.3 cm whereas the thickness of the anode and cathode compartments was 0.6 cm.

During operation, softened water was passed upwardly through the anode compartment at a flow rate of about 230 milliliters per minute (mL/min) at about 25° C. and through the cathode compartment at a flow rate of about 10 mL/min. A 25 (w/w) % aqueous solution of sodium chlorite was added to an effluent from the anode compartment using a peristaltic pump such that the final concentration of sodium chlorite was about 1,000 mg/L as it entered the central compartment. A transverse DC electric field was applied by an external power source via the electrodes, e.g., a controlled current of about 4.5 amps. The effluent from the central compartment was fed to a vessel containing the solid phase trichloro-s-triazinetrione in tablet form. Each tablet was 2.5 cm in diameter having a height of 1.6 cm and a total weight of 14 grams. The vessel consisted of a 40.6 cm long PVC pipe having a diameter of 3.2 cm. Flow was through a diametrically opposed inlet and outlet located in a sidewall of the vessel. Approximately 24 tablets were initially stackedly arranged in the vessel, giving a reaction time of about 1 minute and a solid fraction percent of about 64%.

Figure 7:
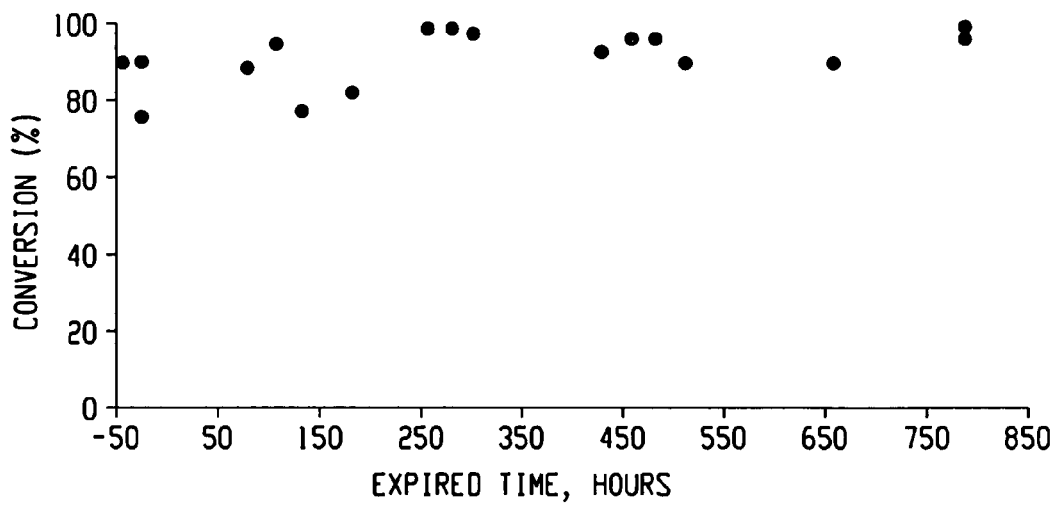
FIG. 7 graphically illustrates % conversion efficiency for the generation of chlorine dioxide from a sodium chlorite solution as a function of time.

The system was operated continuously for about 800 hours. The solid phase trichloro-s-triazinetrione was obtained from a commercial vendor with 90% available chlorine. The uppermost tablets were generally "undissolved" during the initial periods of operation and were gravity fed to a lower position as the lowermost tablets dissolved. Based on the amount of available chloride and the sodium chlorite feed rate, the 11 tablets were expected to last for about 30 hours. The vessel was replenished with tablets approximately every 30 hours. FIG. 7 illustrates that during 800 hours of operation, the conversion efficiency averaged about 93.3%.

A Direct Reading Spectrophotometer, Model No. DR/2010, was used to measure the chlorine dioxide concentration (mg/L) in the solution exiting the electrolytic reactor using Method 8138. For calibration, a pure chlorine dioxide solution was prepared and titrated in accordance with Iodometric Method 4500-$ClO_2$ E as described in the Standard Methods for the Examination of Water and Wastewater, 18th edition, 1998. Prior to calibration, the ultraviolet bulb for the spectrophotometer was replaced and the wavelength calibrated in accordance with the manufacturer's recommendations. Using the pure chlorine dioxide solution obtained from Method 4500-$ClO_2$ E, the spectrophotometer was then given a calibration factor where it deviated from the titrated chlorine dioxide concentration.

EXAMPLE 2

In this example, solid phase calcium hypochlorite was employed using the apparatus of Example 2. During operation, softened water was passed upwardly through acidification cell at a flow rate of about 130 mL/min at 25° C. and through the cathode compartment at a flow rate of about 50 mL/min. A 25 (w/w) % sodium chlorite solution with a 1 to 4 molar ratio of sodium chloride to sodium chlorite was added to an effluent from the anode compartment using a peristaltic pump such that the final concentration of sodium chlorite was about 1,000 mg/L as it entered the central compartment. A transverse DC electric field was applied by an external power source via the electrodes, e.g., a controlled current of about 4.75 amps.

Each tablet of calcium hypochlorite has a 1.9 cm diameter, a height of 1.3 cm and a total weight of 7.0 grams. The amount of inert ingredients contained in the tablets was reported to be 35 (w/w) %. A total of 21 calcium hypochlorite tablets were stackedly arranged in a 30.5 cm long PVC pipe having a 2.5 cm diameter and configured as described in Example 2. The system was operated for a period of 40 hours.

The pH of some of the inert ingredients is believed to have an affect on conversion efficiency. By using a 1 to 4 molar ratio of sodium chloride to sodium chlorite, the generation of hydrochloric acid occurs thereby neutralizing the alkaline inert components in the calcium hypochlorite. Average conversion efficiency was 97.4% over the 40-hour operating period and a pH was 2.77. In contrast, without the addition of sodium chloride to the sodium chlorite solution, conversion efficiency over the 40-hour period was 61.3% and pH was found to be 6.22, thereby confirming the presence of alkaline inert components, which are believed to be carbonates, bicarbonates, and/or hydroxyl species. The use of sodium chloride in the electrochemical acidification cell generates hydrochloric acid, which neutralizes these components.

EXAMPLE 3

In this example, chlorine dioxide was generated by acidifying a sodium chlorite solution with a sulfuric acid solution and then contacting the acidified chlorite solution with trichloroisocyanurate tablets (solid phase chlorine-containing material) using the system generally shown in FIG. 1.

A 25 (w/w) % solution of sodium chlorite and a 25.2° Baume (29.0%) solution of sulfuric acid was added to a feedstream of water using a peristaltic pump such that the final concentration of sodium chlorite ranged from about 140 to 320 milligrams per liter (mg/L) and a molar ratio of $[H_2SO_4]:[NaClO_2]$ of about 2.0. The acidified sodium chlorite feedstream was fed to the vessel containing the trichloroisocyanurate tablets at a flow rate of about 197, 220, and 247 milliliters per minute (mL/min). The vessel was 40.6 cm in length and had a diameter of 3.2 cm. A total of 17 tablets stackedly arranged in the vessel, each tablet measuring 2.5 cm in diameter, a height of 1.6 cm, and a weight of 14 grams. The contact time was 1 minute and the solid fraction was 65%.

The system was operated continuously for a period of 40 hours. Results are shown in Table 1 below.

TABLE 1

| Flow Rate, mL/min | 197 | 220 | 247 |
| --- | --- | --- | --- |
| $NaClO_2$ concentration, ppm | 140 | 221 | 320 |
| $ClO_2$ concentration, ppm | 99 | 148 | 222 |
| Conversion, % | 94.7 | 90.4 | 93.5 |

The results clearly show an average conversion greater than 90% for the entire period of operation.

EXAMPLE 4

In this example, chlorine dioxide was generated using the system generally shown in FIG. 8. Sodium chlorite was first converted to chlorous acid in an electrochemical acidification cell, which was then mixed with a feedstream containing dissolved calcium hypochlorite. The reaction is believed to proceed along the reaction pathway as previously shown by Equation (II) above.

In the acidification cell, softened water was passed upwardly through the anode compartment at a flow rate of about 240 mL/min at 22° C. A 25 (w/w) % solution of sodium chlorite was added to the effluent of the anode compartment using a peristaltic pump such that the final concentration of sodium chlorite was about 625 mg/L. The sodium chlorite solution was then passed through the central compartment. The effluent from the central compartment was blended with the dissolved calcium hypochlorite feedstream. It is noted that each compartment of the acidification cell contained cation exchange resin.

The apparatus for providing the feedstream containing the dissolved calcium hypochlorite included a polyethylene vessel containing approximately 6.3 liters (L) of water. The vessel measured 46 cm in height by 41 cm in width by 20 cm in depth. A cartridge having a diameter of 7.62 cm and a height of 38.1 cm was placed in the vessel such that about 7.6 cm of the cartridge was submerged in the water. The submerged portion of the cartridge was slotted to allow entry of water into a lower portion of the cartridge once submerged. The cartridge was filled with calcium hypochlorite briquettes measuring approximately 1.27 cm in height, 1.91 cm in width, and 3.18 cm in depth. During operation, as the wetted briquettes of calcium hypochlorite dissolved within the submerged portion, dry briquettes were gravity fed from the non-submerged portion of the cartridge, thereby allowing the solution to be continuously saturated. A float valve was used to maintain a constant water level in the vessel.

Figure 9:
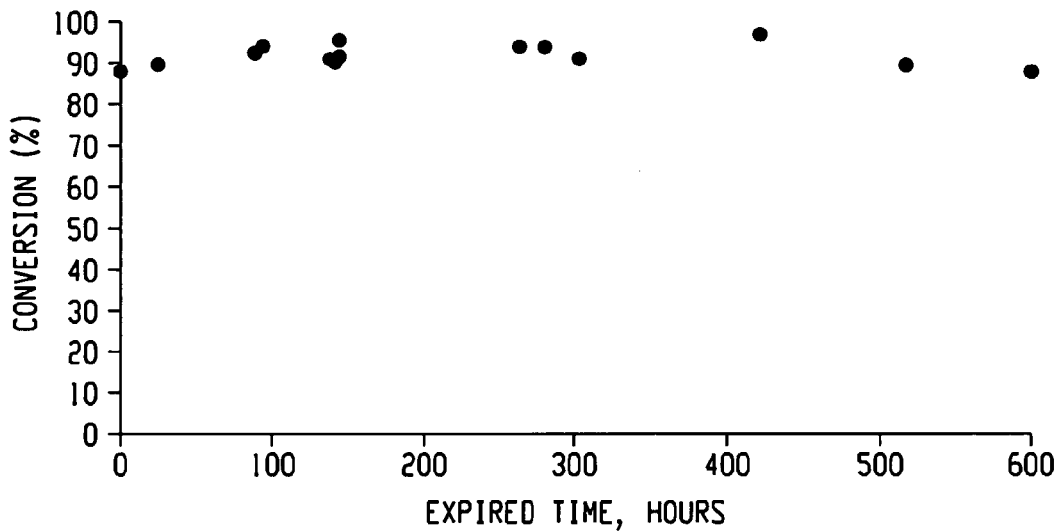
FIG. 9 graphically illustrates chlorine dioxide concentration as a function of time produced using an aqueous halogen or halogen feedstream of calcium hypochlorite.

The system was operated continuously over a period of 600 hours. FIG. 9 graphically illustrates chlorine dioxide concentration as a function of time. The average chlorine dioxide conversion was determined to be 91.6% with an average chlorine dioxide production rate of 7.0 grams per hours (g/h).

EXAMPLE 5

In this example, chlorine dioxide was generated by first converting sodium chlorite to chlorous acid using an electrochemical acidification cell as shown in FIG. 2, and then the chlorous acid with a solution of trichloroisocyanurate using the apparatus as generally shown in FIG. 8. The reaction is believed to proceed along the reaction pathway as previously shown by Equation (VI) above.

In the acidification cell, softened water was passed upwardly through the anode compartment at a flow rate of about 240 mL/min at 22° C. A 25 (w/w) % solution of sodium chlorite was added to the effluent of the anode compartment using a peristaltic pump such that the final concentration of sodium chlorite was about 483 mg/L. The sodium chlorite solution was then passed through the center compartment. The effluent from the central compartment was blended with the dissolved trichloroisocyanurate feedstream.

The apparatus for forming the dissolved trichloroisocyanurate feedstream included a vessel containing approximately 12.6 L of water. Three cartridges having a diameter of 7.62 cm and a height of 38.1 cm were placed in the vessel such that about 15.2 cm of the cartridge was submerged in the water. The lower submerged portion of the cartridge was slotted to allow entry of water into the cartridge once submerged. The cartridge was filled with trichloroisocyanurate tablets measuring 7.6 cm in diameter and 2.5 cm in height. During operation, as the wetted tablets of trichloroisocyanurate dissolved within the lower submerged portion, dry tablets were gravity fed into the submerged portion, thereby allowing the solution to be continuously saturated.

Figure 10:
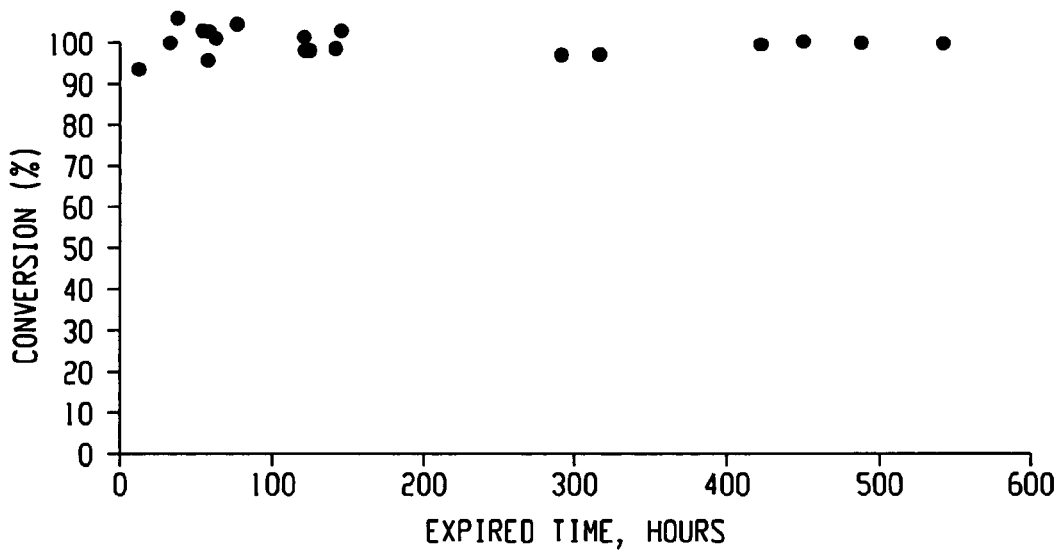
FIG. 10 graphically illustrates chlorine dioxide concentration as a function of time produced using an aqueous halogen or halogen feedstream of trichloroisocyanurate.

The system was operated continuously over a period of 600 hours. FIG. 10 graphically illustrates chlorine dioxide concentration as a function of time. The average chlorine dioxide conversion was determined to be 91.4% with an average chlorine dioxide production rate of 10.3 g/h.

While the disclosure has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the disclosure without departing from the essential scope thereof, such as for producing other halogen oxides. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A system for producing chlorine dioxide, comprising:
an electrochemical acidification cell comprising an anode compartment comprising an anode, a cathode compartment comprising a cathode, and a central compartment positioned between the anode and cathode compartments, wherein the central compartment comprises a cation exchange material and an outlet in fluid communication with a conduit;
an alkali metal chlorite solution in fluid communication with an inlet of the central compartment of the acidification cell;
an effluent from the anode compartment in fluid communication with the inlet of the central compartment of the acidification cell;
a water source in fluid communication with the anode and cathode compartments, wherein operation of the electrochemical acidification cell produces a first feedstream comprising chlorous acid from the conduit; and
a vessel in fluid communication with the conduit and downstream from the electro chemical acidification cell, wherein the vessel is partially filled with water and comprises an outlet in fluid communication with the water; a cartridge having a lower portion with openings in fluid communication with the water; and a solid phase chlorine-containing material disposed within the cartridge, wherein a portion of the solid phase chlorine- containing material is submerged in the water within the cartridge to produce a dissolved chlorine-containing material within the vessel,
wherein the system is configured to combine the first feedstream with the dissolved chlorine containing material within the vessel to produce the chlorine dioxide from the outlet.

2. The system of claim 1, wherein the cation exchange material is selected from the group consisting of strong acid polystyrene divinylbenzene crossliniked resins, weak acid polystyrene divinylbenzene crossliniked resins, irninoacetic acid polystyrene divinylbenzene cro sslinked chelating selective cation exchange resins, synthetic inorganic cation exchangers and naturally occurring cationic exchangers.

3. The system of claim 1, wherein the solid phase chlorine-containing material is selected from the group consisting of calcium hypochlorite lithium hypochlorite, dichloroisocyanurate, trichloroisocyanurate, and mixtures thereof.

4. The system according to claim 1, wherein the electrochemical acidification cell produces a reaction medium pH of about 2 to about 3.

5. The system according to claim 1, wherein comprises a float valve in operative communication with a water inlet, wherein the float valve is adapted to maintain a predetermined level of the water in the vessel.

6. The system according to claim 1, wherein the solid phase chlorine-containing material has a solubility limit of 0.1 to 500 grams per liter.

7. The system according to claim 1, wherein the solid phase chlorine-containing material has a contact area per unit volume of solution of about 0.0002 cm1 to about 3.14 cm1.

8. The system according to claim 1, wherein the water in the vessel is at a temperature of about 5 to about 60° C.

9. The system according to claim 1, wherein a pressure drop across the vessel is about 1 to about 40 pounds per square inch.

10. The system according to claim 1, wherein the central compartment further comprises a catalyst material.

11. The system according to claim 1, wherein a solid fraction of the solid phase chlorine-containing material in the vessel is about 40 to about 90 volume by volume %.

* * * * *